US009907320B2

(12) United States Patent
Lazzarini et al.

(10) Patent No.: US 9,907,320 B2
(45) Date of Patent: Mar. 6, 2018

(54) MACHINE FOR MAKING, STORING AND DISPENSING YOGURT

(71) Applicant: ALI S.p.A.—CARPIGIANI GROUP, Milan (IT)

(72) Inventors: Roberto Lazzarini, Reggio Emilia (IT); Andrea Cocchi, Calderara di Reno (IT)

(73) Assignee: ALI S.p.A.—CARPIGIANI GROUP, Milan (IT)

( * ) Notice: Subject to any disclaimer, the term of this patent is extended or adjusted under 35 U.S.C. 154(b) by 787 days.

(21) Appl. No.: 13/856,944

(22) Filed: Apr. 4, 2013

(65) Prior Publication Data

US 2013/0269540 A1 Oct. 17, 2013

(30) Foreign Application Priority Data

Apr. 12, 2012 (IT) ............................. BO2012A0195

(51) Int. Cl.
*A23C 9/12* (2006.01)
*A23G 9/28* (2006.01)

(52) U.S. Cl.
CPC .............. *A23G 9/28* (2013.01); *A23C 9/1223* (2013.01)

(58) Field of Classification Search
CPC ..... A23C 9/123; A23C 9/1238; A23C 9/1307; A23C 19/0904

(Continued)

(56) References Cited

U.S. PATENT DOCUMENTS 3,269,842 A * 8/1966 Mayer .................... A23C 9/123
426/43
3,924,007 A * 12/1975 Driessen .................. A01J 11/00
426/34

(Continued)

FOREIGN PATENT DOCUMENTS

DE 4434664 4/1996
EP 0572359 12/1993

(Continued)

OTHER PUBLICATIONS

Italian Search Report dated Oct. 31, 2012 from counterpart application.

*Primary Examiner* — Dana Ross
*Assistant Examiner* — Lawrence Samuels
(74) *Attorney, Agent, or Firm* — Shuttleworth & Ingersoll, PLC; Timothy J. Klima

(57) ABSTRACT

This invention relates to a machine for making, storing and dispensing yogurt, comprising a tank for processing a certain quantity of milk, a device for inoculating milk ferments inside the tank, a cylinder for keeping and storing the yogurt, which is connected to the processing tank, a tap for dispensing the yogurt coming from the keeping and storing cylinder; the machine also comprises a heating and cooling unit connected to the processing tank and capable of causing the milk to reach a first pasteurization temperature, a second inoculation temperature, at which a certain quantity of milk ferments is inoculated in the processing tank through the inoculating device, and a third fermentation temperature of the milk ferments; the heating and cooling unit is also connected to the keeping and storing cylinder to cool the yogurt coming from the processing tank and to bring it to a fourth cooling temperature and to a fifth storing and dispensing temperature.

8 Claims, 3 Drawing Sheets

(58) Field of Classification Search
USPC .......... 99/453, 455; 426/43, 34, 583, 42, 61, 426/453, 455; 366/144, 145, 147
See application file for complete search history.

(56) References Cited

U.S. PATENT DOCUMENTS

| | | | | | |
|---|---|---|---|---|---|
| 3,946,657 | A * | 3/1976 | Driessen | .............. | A23C 9/1223 99/455 |
| 4,110,476 | A * | 8/1978 | Rhodes | .................. | A23C 9/123 426/41 |
| 4,258,064 | A * | 3/1981 | Michener, Jr. | ......... | A23C 9/137 426/43 |
| 4,293,573 | A * | 10/1981 | Bradley, Jr. | .......... | A23C 9/1234 426/43 |
| 4,576,822 | A * | 3/1986 | Nordlund | ............. | A23C 9/1209 426/43 |
| 4,590,852 | A * | 5/1986 | Mayer | .................... | A23G 9/045 366/144 |
| 5,054,383 | A * | 10/1991 | Cho | ........................ | A21B 7/005 99/327 |
| 5,280,748 | A * | 1/1994 | Pardo | ........................ | A23L 3/10 99/330 |
| 5,327,818 | A * | 7/1994 | Olivetti | ................ | A23C 9/1223 366/144 |
| 5,823,392 | A | 10/1998 | Madico | | |
| 6,689,402 | B1 * | 2/2004 | Nauth | ................. | A23C 19/0285 426/34 |
| 8,758,678 | B2 * | 6/2014 | Cocchi | .................... | A23G 9/228 222/146.1 |
| 2002/0068112 | A1 * | 6/2002 | Murphy | ................ | A23C 9/1322 426/34 |
| 2008/0226779 | A1 * | 9/2008 | Cocchi | .................... | A23L 3/001 426/231 |
| 2009/0193828 | A1 * | 8/2009 | Cocchi | ..................... | A23G 9/22 62/222 |
| 2009/0311378 | A1 * | 12/2009 | Wilaschin | ............ | A23C 9/1223 426/43 |
| 2010/0074992 | A1 * | 3/2010 | Horiuchi | .................. | A23C 7/04 426/34 |
| 2010/0139493 | A1 * | 6/2010 | Nevarez | ............... | B67D 1/0021 99/275 |
| 2010/0145522 | A1 * | 6/2010 | Claesson | ............... | B67D 1/0021 700/265 |
| 2011/0111095 | A1 | 5/2011 | Chatterjee et al. | | |

FOREIGN PATENT DOCUMENTS

| | | |
|---|---|---|
| EP | 2004971 | 8/2009 |
| JP | 10327761 | 12/1998 |

* cited by examiner

MACHINE FOR MAKING, STORING AND DISPENSING YOGURT

This application claims priority to Italian Patent Application BO2012A000195 filed Apr. 12, 2012, the entirety of which is incorporated by reference herein.

BACKGROUND OF THE INVENTION

This invention relates to a machine for making, storing and dispensing yogurt.

The invention addresses the field of the production, storage and dispensing of artisanal yogurt and similar dairy products in commercial establishments such as yogurt parlors and stalls, patisseries and the like, where artisanally made plain yogurt, with or without toppings or additional ingredients, are served to consumers.

In this context, conventional machines for making artisanal yogurt are known. These include milk pasteurizing machines, fermentation devices for inoculated milk and refrigerating machines for keeping the yogurt.

These conventional machines allow artisanal yogurt to be made according to a production cycle defined by a predetermined sequence of operating steps, as described below.

First of all, the milk from which the yogurt will be made is poured by an operator into a tank of the pasteurizing machine. The pasteurizing machine cooks the milk contained in the tank in a water bath to a defined pasteurization temperature for predetermined lengths of time.

Once the milk has been pasteurized, the milk is cooled in the tank and then inoculated with a defined quantity of milk ferments, usually in proportion to the capacity of the tank. More specifically, the operator adds the milk ferments in the cooled milk using a dosing system.

Next, the operator transfers the pasteurized, cooled and inoculated ilk from the pasteurizing machine to a fermentation tank of the fermentation device.

The fermentation tank reaches a defined fermentation temperature and is maintained for a predetermined length of time in order to promote the growth and multiplication of the bacteria present in the milk ferments.

When fermentation is over, the fermented milk is cooled to a storage temperature, at which point the yogurt production cycle is finished.

At this point, the operator places the yogurt in specific refrigerating machines which keeps the yogurt at a defined storage temperature.

If necessary, additional ingredients or toppings can be added directly to the yogurt when it is served to the consumer.

The conventional machines described above have several disadvantages.

First of all, using a plurality of machines/devices for the yogurt production cycle necessarily involves the presence of an operator responsible for production, from pasteurization to obtainment of the finished yogurt, thus significantly raising the cost of labor added to the costs of the finished product.

Furthermore, using a plurality of machines/devices to make the yogurt is particularly disadvantageous in terms of the space needed for their installation in an artisan shop.

SUMMARY OF THE INVENTION

This invention has for an aim to provide a machine for making, storing and dispensing yogurt, in particular artisanal yogurt, which overcomes the above mentioned disadvantages.

More specifically, the aim of the invention is to provide a machine which does not require the attendance of an operator during the yogurt production cycle once the basic ingredients have been supplied.

A further aim of the invention is to provide a flexible machine, that is, a machine which can make, store and dispense both plain and flavored artisanal yogurt, depending on the taste and requirements of the consumer and seller of the yogurt.

The above specified aims are achieved by a machine for making, storing and dispensing yogurt comprising the technical features set forth herein.

BRIEF DESCRIPTION OF THE DRAWINGS

Further features and advantages of the invention are more apparent in the detailed description below of a preferred, non-limiting embodiment of a machine for making, storing and dispensing yogurt, as illustrated in the accompanying drawings, in which.

DESCRIPTION OF THE PREFERRED EMBODIMENTS

Figure 1:
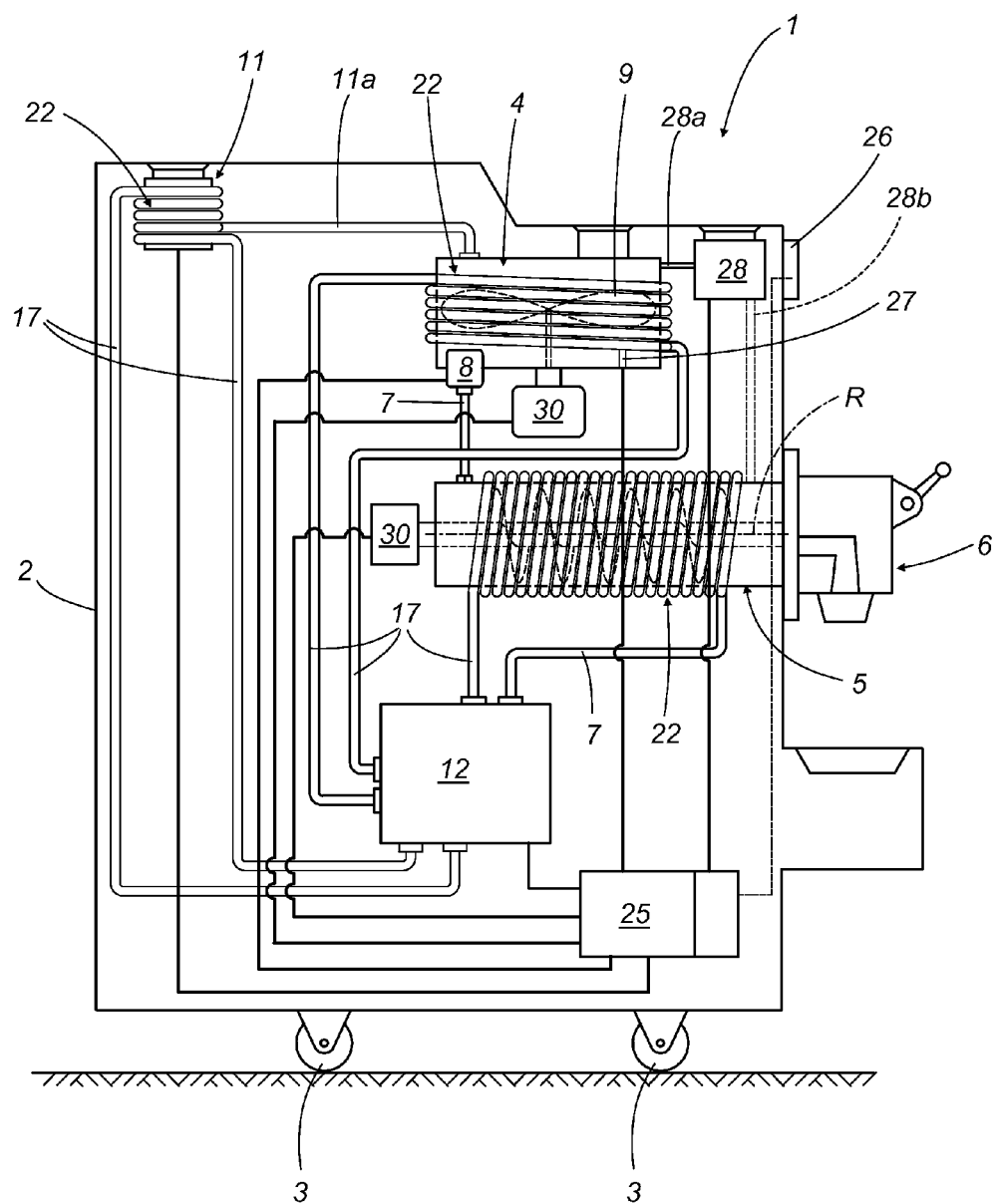
FIG. 1 shows a schematic view of a machine for making, storing and dispensing yogurt according to this invention.

With reference in particular to FIG. 1, the numeral 1 denotes a machine for making, storing and dispensing yogurt, comprising a mounting frame 2 substantially in the shape of a parallelepiped.

The mounting frame 2 is equipped with a plurality of wheels 3 which advantageously allow the machine 1 to be easily moved and positioned in a production room or shop.

The machine 1 comprises a tank 4 for processing a certain quantity of milk, a cylinder 5 for keeping and storing the yogurt, which is connected to the processing tank 4, and a tap 6 for dispensing the yogurt coming from the keeping and storing cylinder 5.

The processing tank 4 is located at the top of the machine 1, making it easier to access for pouring the milk into it.

Inside the processing tank 4, a first mixer 9 stirs the milk used for preparing the yogurt.

Preferably, the processing tank 4 has a lid, not illustrated, which closes the top of it and which protects the contents of the tank.

The yogurt keeping and storing cylinder 5 is mounted under the processing tank 4.

The processing tank 4 is connected to the keeping and storing cylinder 5 by a connecting pipe 7.

Advantageously, the processing tank 4 comprises suction means 8 which are in fluid communication with the connecting pipe 7 and which allow the yogurt to be more easily transferred from the processing tank 4 to the keeping and storing cylinder 5. The suction means 8 may, for example, be in the form of a pump.

The keeping and storing cylinder 5 extends substantially horizontally along its longitudinal axis.

Inside the cylinder 5 there is a second mixer 10 which, besides continuously stirring it, feeds the yogurt towards the dispensing tap 6. The second mixer 10 rotates about a horizontal axis of rotation R which is substantially parallel to the axis of extension of the keeping and storing cylinder 5.

Preferably, the second mixer 10 is in the form of a mixing and feeding screw which moves the yogurt from the bottom of the cylinder 5 towards the dispensing tap 6.

The first mixer 9 and the second mixer 10 are driven by respective motor means 30.

The machine 1 comprises an inoculating device 11 in fluid communication with the processing tank 4. The inoculating device 11 is designed to deliver a predetermined quantity of milk ferments into the processing tank 4 during the preparation of the yogurt. Preferably, the predetermined quantity of milk ferments is proportional to the capacity of the processing tank 4 or to the quantity of milk inside the tank.

Inside the frame 2 of the machine 1 there is a heating and cooling unit 12 comprising a heating circuit 13 and a refrigerating circuit 14. The heating circuit 13 and the refrigerating circuit 14 are both connected to the processing tank 4, to the keeping and storing cylinder 5 and to the inoculating device 11.

Preferably, the heating circuit 13 and the refrigerating circuit 14 work with refrigerant.

Figure 3:
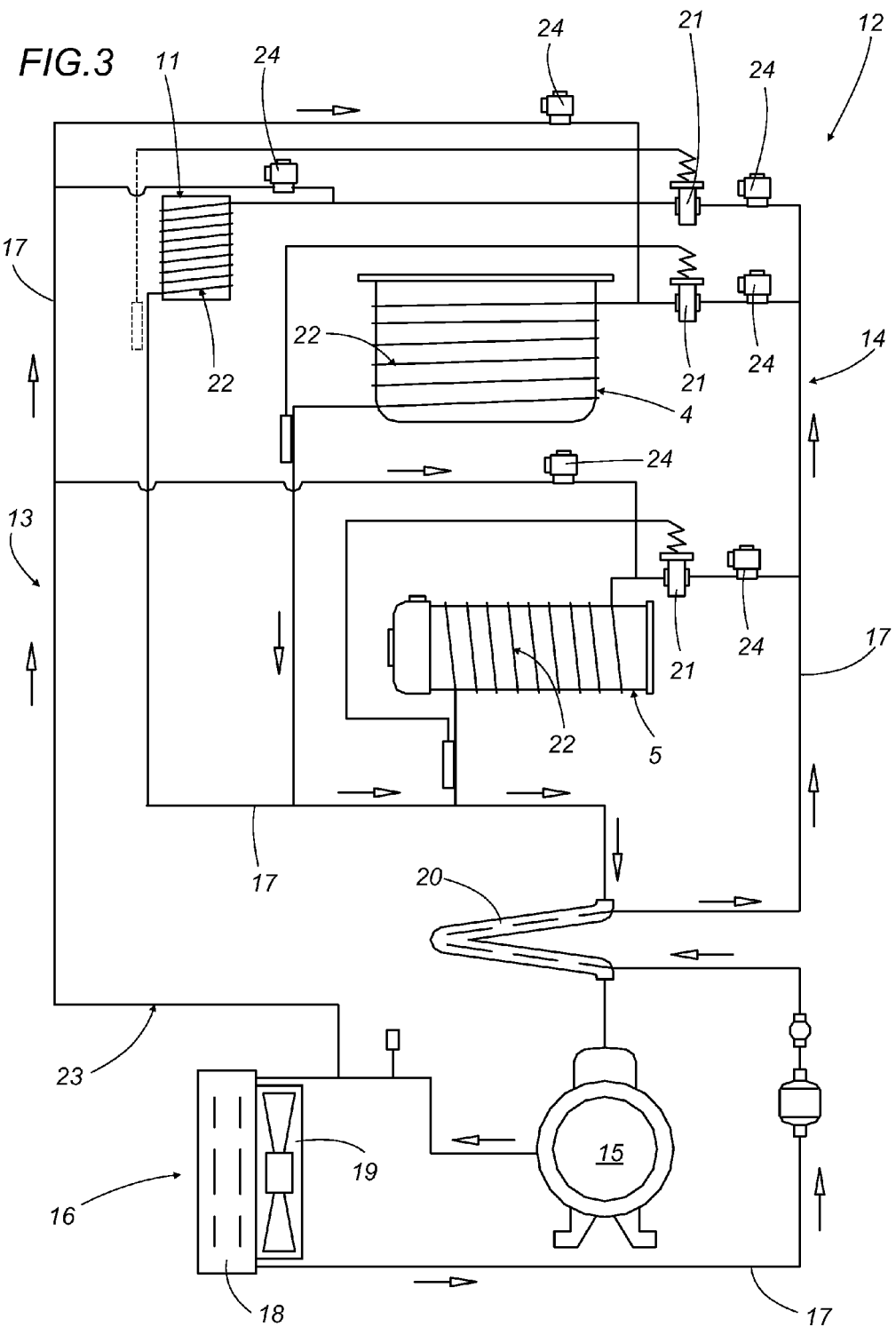
FIG. 3 shows a schematic view of a heating and cooling system according to the invention.

The heating and cooling unit 12 comprises a power compressor 15, a refrigerating device 16 located downstream of the power compressor 15, and a pipe system 17 in which the refrigerant flows, as illustrated in FIG. 3.

In particular, the power compressor 15 adiabatically compresses the refrigerant. In order to cool the refrigerant, the refrigerant leaving the power compressor 15 is delivered to the refrigerating device 16 which isobarically cools it. More specifically, the refrigerating device 16 comprises a radiator 18 and a fan 19 whose combined action allows the compressed refrigerant to be cooled.

The compressed, cooled refrigerant leaving the refrigerating device 16 flows into an intermediate heat exchanger 20 and from there to one or more laminating elements 21 which adiabatically expand the compressed, cooled refrigerant.

More specifically, the refrigerating circuit 14 comprises a plurality of laminating elements 21 located downstream of the refrigerating device 16. More precisely, each laminating element 21 is located upstream of a coil 22 associated respectively with the processing tank 4, with the keeping and storing cylinder 5 and with the inoculating device 11.

In the embodiment described, the laminating element 21 is an expansion valve. Preferably, the laminating element 21 is an adjustable automatic expansion valve.

The refrigerating circuit 14 comprises a plurality of shutoff solenoid valves 24, each located immediately upstream of the respective laminating element 21.

The shutoff solenoid valve 24 opens and closes to turn the flow of cooled refrigerant on and off in the respective laminating element 21 and, hence, in the respective coil 22, depending on whether or not heat is to be removed from the processing tank 4, from the keeping and storing cylinder 5 or from the inoculating device 11.

If all the shutoff solenoid valves 24 are open, the expanded refrigerant leaving the laminating elements 21 flows through the respective coils 22 of the processing tank 4, of the keeping and storing cylinder 5 and of the inoculating device 11. That way, the cooled refrigerant removes heat from the contents of the processing tank 4, of the keeping and storing cylinder 5 and of the inoculating device 11, thereby cooling them down and, at the same time, heating itself up.

On leaving the respective coils 22, the heated refrigerant flows through the intermediate heat exchanger 20 in the opposite direction to the compressed, cooled refrigerant. Thus, the heated refrigerant is at least partly cooled before it enters the power compressor 15, thereby increasing the efficiency of the subsequent compression stage.

The heating circuit 13 is embodied by a branch 23 which prevents the compressed, heated refrigerant from reaching the refrigerating device 16. The branch 23 allows the compressed, heated refrigerant to reach the respective coils 22 of the processing tank 4, of the keeping and storing cylinder 5 and of the inoculating device 11. That way, the compressed, heated refrigerant adds heat to the contents of the processing tank 4, of the keeping and storing cylinder 5 and of the inoculating device 11, thereby heating them up and, at the same time, cooling itself down.

On leaving the respective coils 22, the refrigerant flows through the intermediate heat exchanger 20 and into the power compressor 15.

The heating circuit 13 comprises a plurality of shutoff solenoid valves 24, each located immediately upstream of the processing tank 4, of the keeping and storing cylinder 5 and of the inoculating device 11.

The shutoff solenoid valves 24 open and close to turn the flow of compressed, heated refrigerant on and off in the respective coils 22, depending on whether or not heat is to be added to the processing tank 4, to the keeping and storing cylinder 5 or to the inoculating device 11.

In use, the machine 1 performs the artisanal yogurt production cycle by means of the heating and cooling unit 12.

Through the heating circuit 13, the heating and cooling unit 12 brings the milk inside the processing tank 4 up to a first pasteurization temperature T1. The heating and cooling unit 12 keeps the milk at the first pasteurization temperature T1 for a defined length of time.

Preferably, the first pasteurization temperature T1 is substantially 95° C.

It should be noted that the shutoff solenoid valves 24 of the heating circuit 13, upstream of the coils 22 of the keeping and storing cylinder 5 and of the inoculating device 11 are open during sanitization of the machine 1.

Once the milk has been pasteurized, the heating and cooling unit 12, through the refrigerating circuit 14, cools the milk inside the processing tank 4 down to a second inoculation temperature T2. Preferably, the second inoculation temperature T2 is in a temperature range substantially between 40 and 45° C.

While the milk is being cooled down to the second inoculation temperature T2, the shutoff solenoid valve 24 of the heating circuit 13 located upstream of the coil 22 of the processing tank 4 is closed, while the shutoff solenoid valve 24 of the cooling circuit 14 located upstream of the coil 22 of the processing tank 4 is open, allowing the cooled refrigerant to flow through.

At the second inoculation temperature T2, a predetermined quantity of milk ferments is inoculated into the processing tank 4 through the inoculating device 11. More specifically, the inoculating device 11 is connected to the processing tank 4 by a feed pipe 11a through which the milk ferments are inoculated into the tank 4.

In an alternative embodiment, not illustrated, the milk ferments are added into the processing tank 4 manually by an operator using a dosing device.

When the milk ferments have been inoculated into the cooled milk, the heating and cooling unit 12 brings the inoculated milk inside the processing tank 4 to a third fermentation temperature T3.

The heating and cooling unit 12 keeps the inoculated milk at the third fermentation temperature T3 for a defined length of time.

Preferably, the third fermentation temperature T3 is substantially 42° C. The inoculated milk is kept at the third fermentation temperature T3 for a time interval of between 6 and 7 hours.

Advantageously, an adjustment and control unit 25 is logically connected to the heating and cooling unit 12 and is capable of adjusting the value of each of the first, second and third temperatures T1, T2 and T3 based on a respective preset, predetermined temperature value and a respective preset, predetermined time interval.

The inoculating device 11 is logically connected to the adjustment and control unit 25. That way, the adjustment and control unit 25 controls the automatic release of the milk ferments into the processing tank 4 when the pasteurized milk reaches the second inoculation temperature T2.

Alternatively, the inoculating device 11 may inoculate a certain quantity of serum-lactose instead of milk ferments into the pasteurized milk inside the processing tank 4.

Advantageously, the inoculating device 11 comprises suction means 8 which are in fluid communication with the feed pipe 11a and which allow the milk ferments to be more easily transferred into the processing tank 4. The suction means 8 are connected to, and controlled by, the adjustment and control unit 25.

When the predetermined degree of fermentation has been reached, the milk inside the processing tank 4 is transferred into the keeping and storing cylinder 5 through the connecting pipe 7.

The degree of fermentation of the milk inside the processing tank 4 is measured by a measuring device 27. This allows the milk to be transferred from the tank 4 to the cylinder 5 at the most suitable moment. Preferably, the measuring device 27 is a pH meter.

The measuring device 27 is logically connected to the adjustment and control unit 25 in such a way that the adjustment and control unit 25 detects the degree of milk fermentation measured by the measuring device 27 and, based on the preset degree of fermentation, causes the fermented milk to be transferred from the processing tank 4 to the keeping and storing cylinder 5. More specifically, the adjustment and control unit 25 acts on the suction means 8 of the processing tank 4.

Through the refrigerating circuit 14 of the heating and cooling unit 12, the fermented milk from the processing tank 4 is then cooled in the keeping and storing cylinder 5 until reaching a fourth cooling temperature T4.

Preferably, the fourth cooling temperature T4 is substantially 4° C.

When the fourth cooling temperature T4 is reached, the yogurt production cycle is over.

At this point, the heating and cooling unit 12 keeps the yogurt in the keeping and storing cylinder 5 at a fifth storing and dispensing temperature T5 until it is dispensed through the dispensing tap 6.

Preferably, the fifth storing and dispensing temperature T5 is substantially 4° C.

The adjustment and control unit 25 is capable of adjusting each value of the fourth and fifth temperatures T4 and T5 based on a respective preset, predetermined temperature value.

Advantageously, an operator interface 26 is logically connected to the adjustment and control unit 25, allowing an operator to set the first, second, third, fourth and fifth temperatures T1, T2, T3, T4 and T5 and the respective time intervals for which these temperatures are to be kept, depending on the yogurt recipe. For example, the time interval for which the third fermentation temperature T3 is kept affects the acidity of the yogurt made.

Further, the adjustment and control unit 25 controls the motor means 30 of the first and second mixers 9 and 10, also adjusting their speed of rotation.

The machine 1 described up to now can make plain artisanal yogurt.

In order to extend the range of artisanal yogurt production with different flavors, thus increasing the flexibility of the machine 1, the machine 1 comprises a topping dispensing device 28.

The term "topping" is used to include additional ingredients in liquid/semiliquid form such as fruit preparations, flavored syrups and the like, and additional ingredients in solid form such as cereals and dry fruit, biscuits and the like.

Depending on whether the topping is to be added into the processing tank 4 while the milk is being processed or directly into the yogurt stored in the keeping and storing cylinder 5, the dispensing device 28 can be placed in communication with the processing tank 4 and with the keeping and storing cylinder 5 or both.

More specifically, the dispensing device 28 may be placed in communication with the processing tank 4 through a first pipe 28a and with the keeping and storing cylinder 5 or with both through a second pipe 28b.

The topping dispensing device 28 is logically connected to the adjustment and control unit 25 in such a way that the latter controls the dispensing of the topping according to the type of topping to be added.

Advantageously, the operator can set the moment to release the topping during the yogurt production cycle using the operator interface 26.

Figure 2:
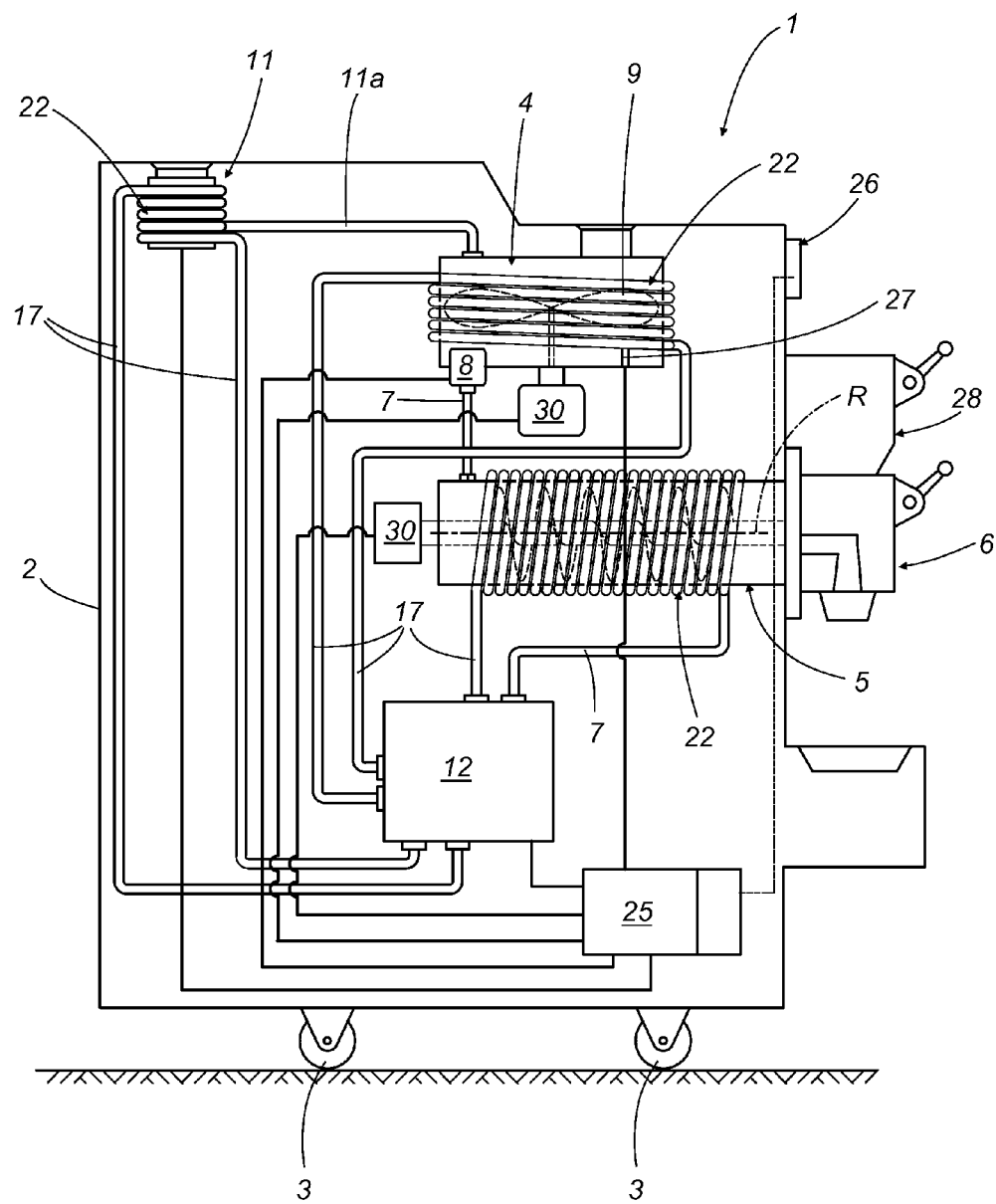
FIG. 2 illustrates a second embodiment of the machine of FIG. 1.

With reference in particular to FIG. 2 the topping dispensing device 28 is in communication with the yogurt dispensing tap 6. More specifically, is located at the top of the dispensing tap 6 in such a way that the topping can be added directly to the yogurt when the yogurt is dispensed. In this case, the operator who dispenses the yogurt from the machine 1 can also add the topping using the dispensing device 28.

Preferably, the topping dispensing device 28 and the inoculating device 11 are located at the top of the machine 1 so they can be easily accessed for filling with the respective products.

In an alternative embodiment, the yogurt production cycle is performed and completed in the processing tank 4. In this case, the keeping and storing cylinder 5 can be used not only to store the yogurt made in the processing tank 4, but also to make yogurt gelato or yogurt semifreddo.

To complete the yogurt production cycle in the processing tank 4, it is sufficient to allow the compressed, cooled refrigerant to flow through the laminating valve 21 in order to remove heat from the processing tank 4 and bring the fermented milk inside it down to the fourth cooling temperature T4.

The machine 1 as described allows the disadvantages of the prior art to be overcome and achieves the above mentioned aims.

Advantageously, the machine 1 does not require an operator to be in attendance during the yogurt production cycle.

In effect, once the operator has loaded the basic ingredients into the machine 1, the entire yogurt production cycle is fully automatic.

Another advantage is that a single machine 1 is capable of making the yogurt and storing it until the moment it is dispensed, which means considerable savings on dedicated space in artisan production rooms or shops.

What is claimed is:

1. A machine for making, storing and dispensing yogurt, comprising:
   a tank for processing a certain quantity of milk,
   an inoculating device including a container for containing inoculating milk ferments and a line for delivering a predetermined quantity of the inoculating milk ferments into the tank,
   a tap for dispensing yogurt,
   a first mixer inside the tank for processing and mixing the milk and the yogurt;
   a heating and cooling unit connected to a first coil associated with the tank; the heating and cooling unit configured to cause the milk to reach a first temperature for pasteurization, a second temperature for inoculation, at which a certain quantity of milk ferments is inoculated in the processing tank, and a third temperature for fermentation of the milk ferments; the heating and cooling unit being configured to cool the yogurt inside the tank and bring it to a fourth temperature for cooling and to a fifth temperature for storing and dispensing;
   an adjustment and control unit for adjusting and controlling the heating and cooling unit programmed and configured for adjusting and controlling the heating and cooling unit to provide each value of the first, the second, the third, the fourth and the fifth temperatures based on a respective predetermined and set temperature value and based on a respective time interval for maintaining the temperatures;
   a feed pipe connecting the inoculating device to the tank for feeding milk ferments from the inoculating device to the tank to inoculate the milk in the tank;
   wherein the inoculating device is logically connected to the adjustment and control unit, the adjustment and control unit programmed to control and command the inoculating device to automatically release of a certain quantity of milk ferments through the feed pipe to the tank once the adjustment and control unit has controlled the heating and cooling unit to bring the milk in the tank to the second temperature for inoculation;
   a cylinder for keeping and storing the yogurt, which is connected to the tank, wherein the tap is connected to the cylinder,
   a second mixer inside the cylinder for mixing the milk and yogurt, respectively;
   the heating and cooling unit also being connected to a second coil associated with the cylinder to cool the yogurt coming from the tank and to bring it to the fourth temperature for cooling and to the fifth temperature for storing and dispensing;
   wherein the heating and cooling unit is connected to a third coil associated the inoculating device;
   wherein the heating and cooling unit comprises a heating circuit, a refrigerating circuit and a single compressor for supplying refrigerant to both the heating circuit and the refrigerating circuit; the heating circuit and the refrigerating circuit configured to cause the milk contained in the tank to reach the first, the second and the third temperatures and causing the yogurt contained in the cylinder to reach the fourth and the fifth temperatures;
   wherein an output of the single compressor is connected to the heating circuit to supply compressed heated refrigerant to the heating circuit;
   the heating and cooling unit further comprising a refrigerating device including a radiator connected between the output of the compressor and the refrigerating circuit for cooling a portion of the compressed heated refrigerant to supply cooled refrigerant to the refrigerating circuit;
   wherein the refrigerating circuit includes first, second and third laminating elements and first, second and third shutoff valves, with the first laminating element and first shutoff valve positioned upstream of and connected to the first coil associated with the tank; the second laminating element and second shutoff valve positioned upstream of and connected to the second coil associated with the cylinder, the third laminating element and third shutoff valve positioned upstream of and connected to the third coil associated with the inoculating device, and wherein each respective one of the first, second and third shutoff valves is located immediately upstream of the respective one of the first, second and third laminating elements, the first, second and third laminating elements each expanding the cooled refrigerant to further cool the cooled refrigerant;
   wherein the heating circuit includes a fourth shutoff valve positioned upstream of and connected to the first coil associated with the tank; a fifth shutoff valve positioned upstream of and connected to the second coil associated with the cylinder, and a sixth shutoff valve positioned upstream of and connected to the third coil associated with the inoculating device;
   a measuring device for measuring a fermentation level of the yogurt in the tank, the measuring device being logically connected to the adjustment and control unit;
   the adjustment and control unit programmed to detect the fermentation level measured by the measuring device of the yogurt in the tank and control the transfer of the yogurt from the tank to the cylinder once a predetermined fermentation level is reached;
   the adjustment and control unit programmed to control the transfer of the yogurt from the tank to the cylinder while the yogurt is at the fermentation temperature.

2. The machine according to claim 1, and further an operator interface which is connected to the adjustment and control unit to allow an operator to set, through the interface, the first, the second, the third, the fourth and the fifth temperatures and the respective time intervals for keeping the temperatures.

3. The machine according to claim 1, and further comprising a device for dispensing yogurt toppings, which communicates with the at least one chosen from the tank and the cylinder.

4. The machine according to claim 1, and further comprising a device for dispensing yogurt toppings, which is mounted at the tap.

5. The machine according to claim 3, wherein the device for dispensing yogurt toppings is logically connected to the adjustment and control unit; the adjustment and control unit controlling a release of the yogurt toppings.

6. The machine according to claim 1, and further comprising a pump for transferring the milk ferments from the inoculating device to the tank.

7. The machine according to claim 6, and further comprising a communication line connecting the inoculating device to the adjustment and control unit.

8. The machine according to claim 1, and further comprising a communication line connecting the inoculating device to the adjustment and control unit.

* * * * *